United States Patent [19]

Sharma

[11] 4,338,516
[45] Jul. 6, 1982

[54] OPTICAL CRYSTAL TEMPERATURE GAUGE WITH FIBER OPTIC CONNECTIONS

[76] Inventor: Robert A. Frosch, Administrator of the National Aeronautics and Space Administration, with respect to an invention of Madan M. Sharma, Palos Verdes, Calif.

[21] Appl. No.: 186,881

[22] Filed: Sep. 12, 1980

[51] Int. Cl.³ ............................................. G01J 3/34
[52] U.S. Cl. .............................. 250/226; 250/231 R; 374/162
[58] Field of Search ............. 73/355 R, 355 EM, 356; 250/226, 227, 231 R

[56] References Cited

U.S. PATENT DOCUMENTS

| | | | |
|---|---|---|---|
| 4,119,845 | 10/1978 | Jaskolski et al. | 250/231 R |
| 4,136,566 | 1/1979 | Christensen | 73/356 |
| 4,260,883 | 4/1981 | Onoda et al. | 250/226 |

*Primary Examiner*—David C. Nelms
*Attorney, Agent, or Firm*—Edward K. Fein; John R. Manning; Marvin F. Matthews

[57] ABSTRACT

An optical temperature gauge using a semiconductor crystal (12) having a band-edge shift property which is temperature dependent. An external narrow band light source (10) provides optical excitation through an optical fiber (11) and light energy thus passed through the crystal (12) is conveyed by a second optical fiber (13) to a light-to-electric transducer (14) at an external location, the crystal (12) thereby being locatable in cryogenic or other systems, to provide remote read-out. The light wavelength is varied (scanned) in a repetitive pattern in source (10), the instantaneous wavelength passing over the band-edge wavelength during each cycle of the scan. The timing of the crossover is related to the temperature of the crystal by electronic means (15 and 17). Several alternative elements of instrumentation are disclosed.

A variation in the basic measurement apparatus is also disclosed, in which the band gap voltage of a light source (10) such as a laser diode is evaluated at the time of band-edge crossover in the crystal (12) and converted to a temperature value.

13 Claims, 12 Drawing Figures

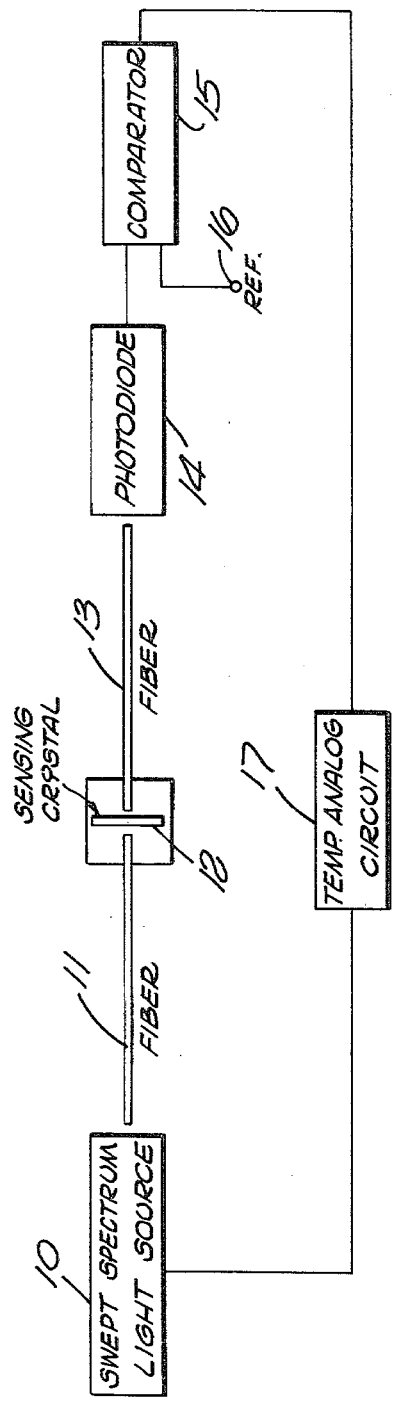
FIG. 1
FIG. 1a
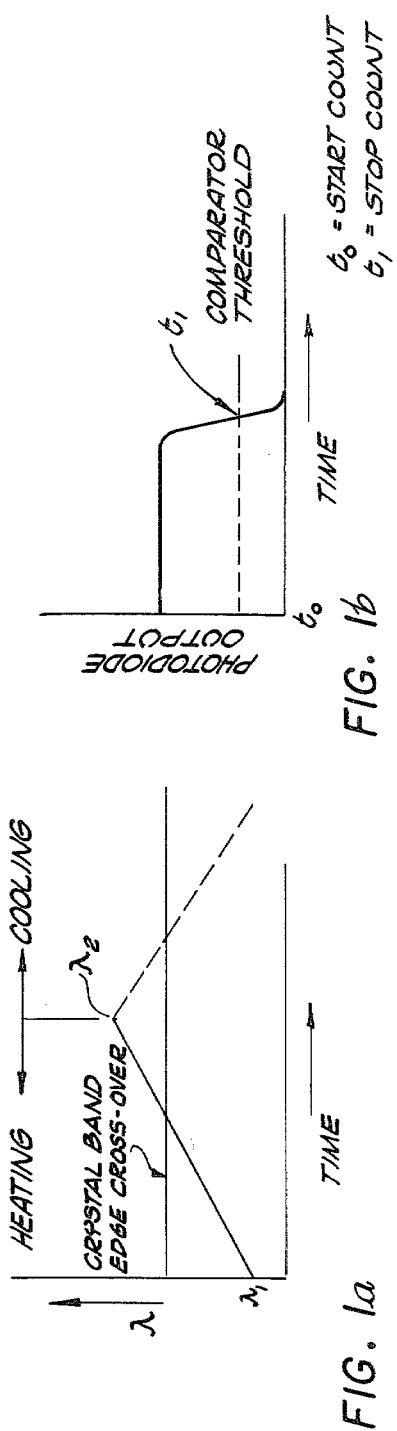
FIG. 1b

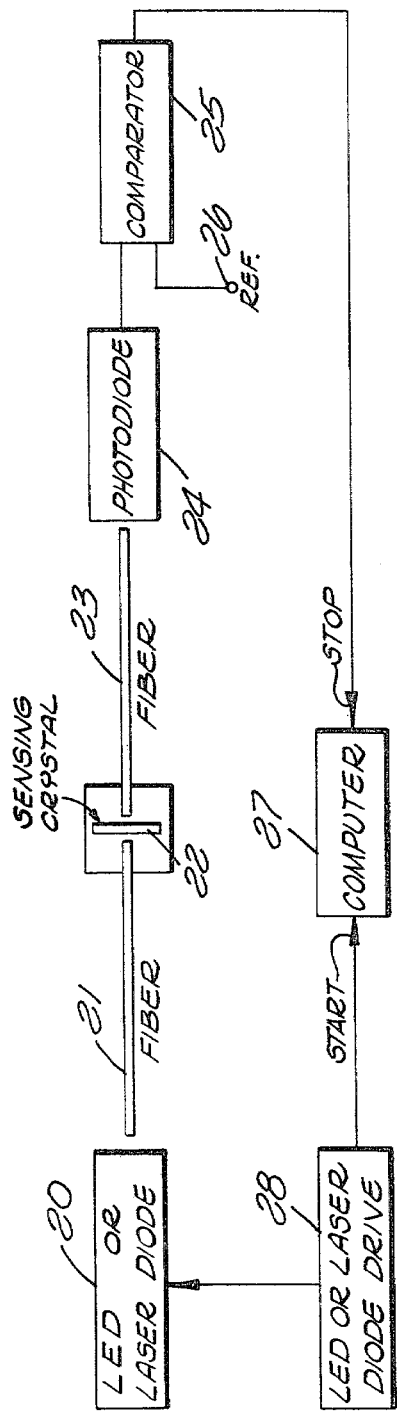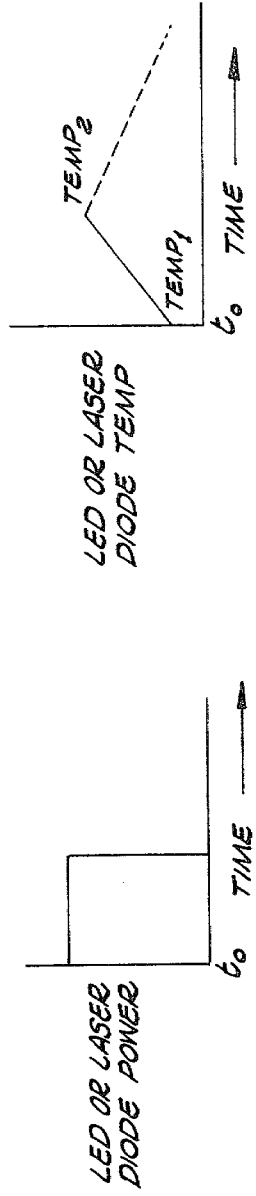
FIG. 2
FIG. 2a
FIG. 2b

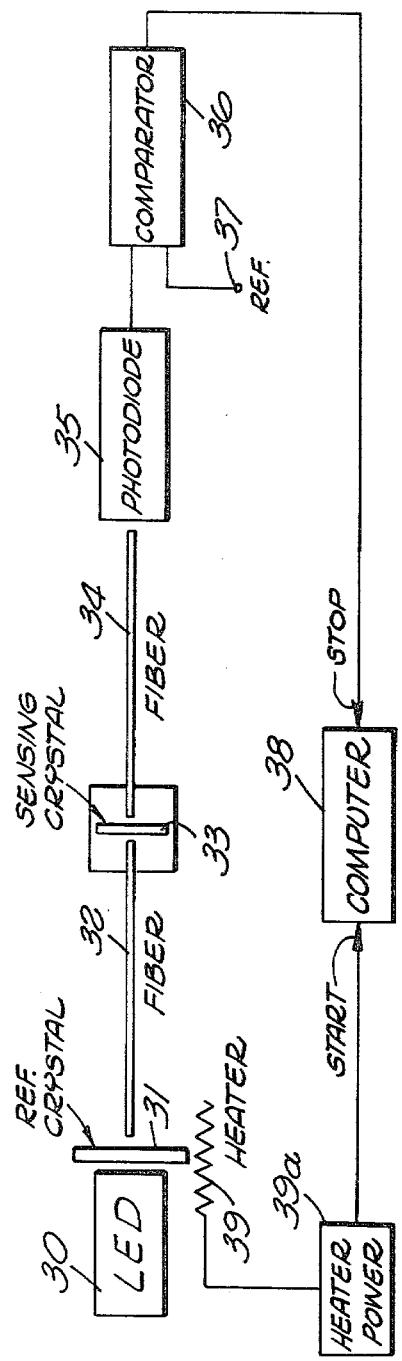
FIG. 3
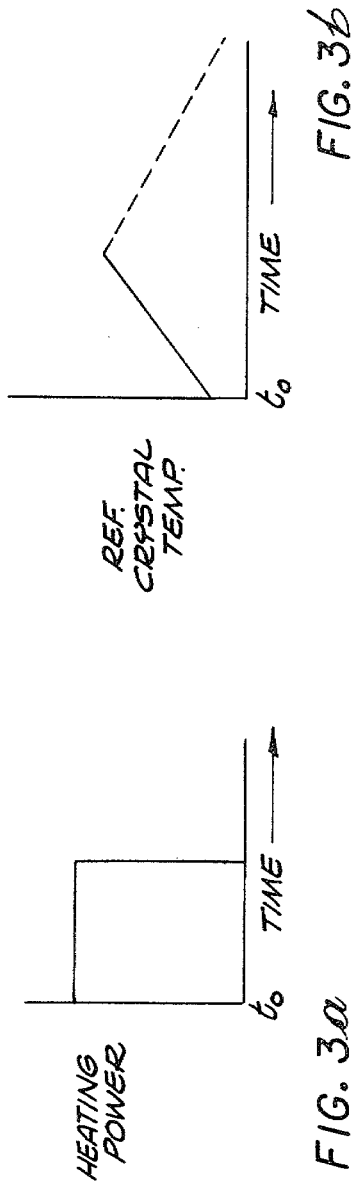
FIG. 3b
FIG. 3a

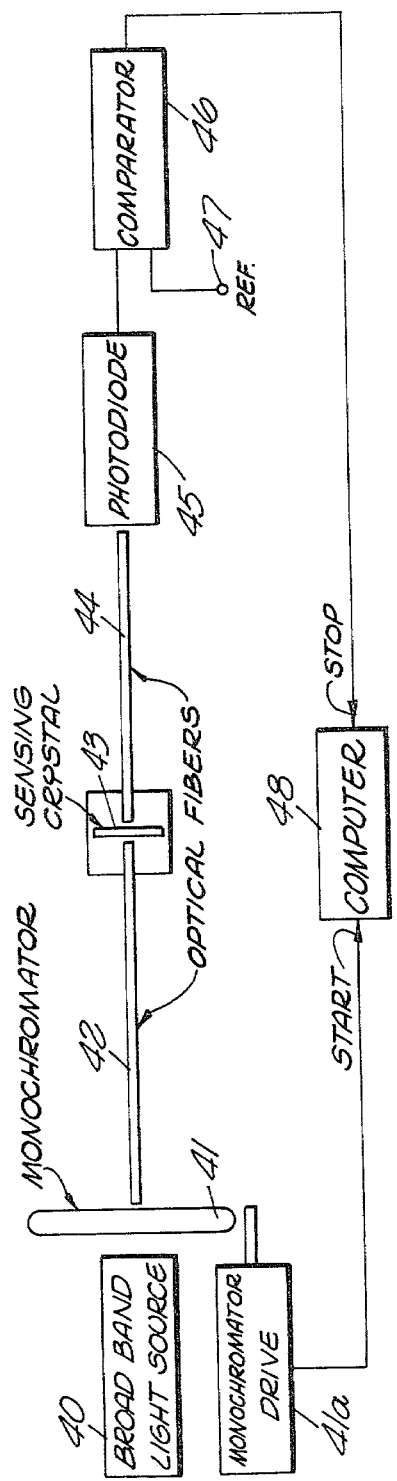
FIG. 4
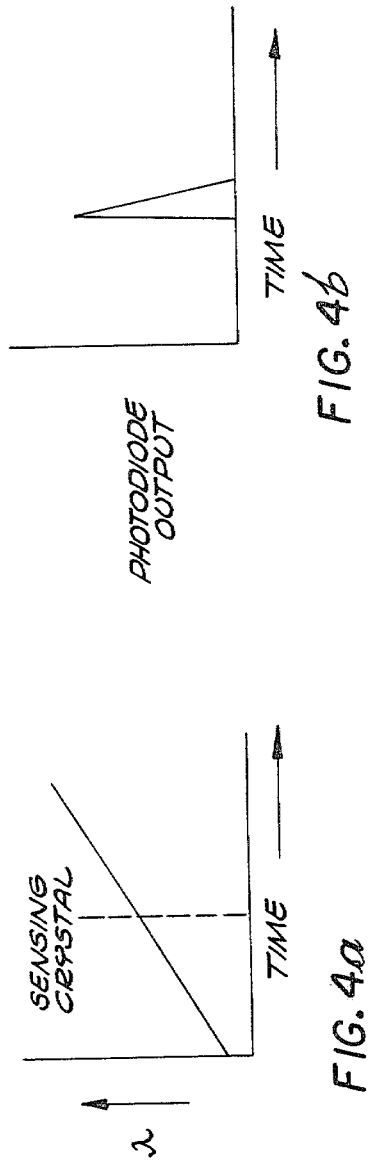
FIG. 4b
FIG. 4a

OPTICAL CRYSTAL TEMPERATURE GAUGE WITH FIBER OPTIC CONNECTIONS

DESCRIPTION

Origin of the Invention

The invention described herein was made in the performance of work under a NASA contract and is subject to the provisions of Section 305 of the National Aeronautics and Space Act of 1958, Public Law 85-568 (72 Stat. 435; U.S.C. 2457).

Technical Field

My invention relates to temperature measurement generally and more specifically to apparatus for remote, highly reliable and accurate, temperature measurement adaptable to environmental extremes such as encountered in cryogenic systems.

In cryogenic and certain other applications, it is often important that a temperature measuring system be immune to strong electromagnetic fields and that electric signals not be present at the point of measurement. It is known that high energy fuels are easily ignited spuriously due to failures of electrical systems associated therewith. One of the prime applications of the invention is temperature measurement in such systems.

The physical principle which makes the device of the invention possible is the so-called band-edge shift extant in a semiconductor crystal as a function of temperature. That "edge" is actually a discontinuity in the light transmission of a semiconductor crystal, such as a crystal of Indium Phosphite Telluride, for example, at a light wavelength which depends on temperature. That is light incident on a semiconductor crystal of photon energy greater than the band-gap energy undergoes a sharp increase in absorption. The corresponding optical wavelength of the band-gap energy is known as the fundamental absorption edge and is temperature dependent.

Since band-gap energy, according to semiconductor theory, is a function of the lattice constant, it follows that, as the semiconductor expands with increasing temperature, the band-gap energy decreases and this results in an increase in the wavelength of significant absorption. Experimental studies have revealed that the rate of change in band-edge wavelength over a large range of temperatures is essentially constant. Accordingly these properties of semiconductor absorption means temperature provide the basis for devising an accurate optical sensor and read-out system according to the invention.

Background Art

The art relating to measurement of temperatures is voluminous and includes many purely mechanical devices such as the familiar mercury column thermometer, many arrangements relying upon thermal expansion of solid members, and electrical devices which measure variations of such parameters as electrical resistance which is temperature dependent.

The instrumentation required for temperature measurement in systems such as hereinbefore referenced, precludes the use of most prior art temperature measuring devices and requires a degree of sophistication well beyond the prior art. Since the advent of optical fibers as optical signal conductors, it has been possible to couple a temperature transducer located in a remote and even environmentally hostile circumstance and couple thereto with these non-conducting, non-magnetic, chemically inert conductors for a relatively remote presentation or utilization of temperature data.

In U.S. Pat. No. 4,151,747 several embodiments of temperature gauge employing the optical fiber itself as the temperature sensing transducer are disclosed. Those various embodiments involve various phenomena which vary the light outputted from an end of an optical fiber exposed to the environment the temperature of which is to be measured. These phenomena include transmission variations due to temperature induced variations in fiber curvature, index of refraction and evanescent cross coupling between adjacent optical fibers. In every case, a light amplitude measurement at an output end is contemplated. Such measurements are known to be different to make accurately and repeatably.

In U.S. Pat. No. 4,140,393, a birefringent crystal is the sensing element and polarization changes in incident light energy as a function of temperature are detected. Although a 0.1° C. resolution is claimed, the device of that reference appears to operate satisfactorily only over a fairly limited range of temperatures, i.e. 12.5° C. to 65° C. as given. Accordingly, the flexibility and applicability of the device appears to be limited.

In U.S. Pat. No. 4,016,761, another temperature probe configuration also relying on optical fiber connections is disclosed. The operation of this device is based on variable reflectance from a liquid crystal as a function of temperature. The device is apparently mainly applicable to measurement of biological tissue temperatures, another quite limited range of operation.

None of the foregoing prior art devices appear to be operable either over a large range of temperatures or the low mean temperatures encountered in cryogenic systems.

In U.S. Pat. No. 4,136,566, a device also oriented toward biological tissue temperature measurement is disclosed, however that reference relies on the shift, with temperature change, of the optical absorption wavelength in a semiconductor material. The measurement technique involves light intensity measurement, in an intensity detector, of light either reflected or refracted. It has been determined to be difficult to measure such intensity valves to a high order of accuracy, and the instrumentation is subject to a number of influences which affect intensity extraneously and thereby introduce drift and other errors.

The absorption band-edge phenomenon is not sharp in a practical crystal used as a temperature sensor, and that fact introduces an additional difficulty in making an accurate light intensity evaluation.

The manner in which the invention advances the state of this art through instrumentation of improved reliability and accuracy will be understood as this specification proceeds.

Disclosure of Invention

In accordance with the present invention, I provide four variations in specific instrumentation. Each of these basically comprises a light source of variable spectrum as a function of time. This variation is an optical equivalent to a frequency sweep in electronic systems. A semiconductor crystal located at a relatively remote point where temperature is to be measured is illuminated by the light source through an optical fiber and a second optical fiber redirects light passed through the crystal to the reading location. As the crystal changes temperature the "skirt" or absorption band-edge changes, i.e. the light frequency (or wavelength) at which the light transmission of the crystal passes from minimum to maximum or vice versa is varied as a very stable and repreatable function. Frequency (wavelength) scanning of the light source output spectrum from a reference point at least sufficient to cross the crystal absorption band-edge for all temperatures of interest is coupled with a time measuring arrangement. The semiconductor crystal may be thought of as an optical low-pass filter in light frequency terms, or a high-pass filter in wavelength terms. The transition edge, having a slope gradient less abrupt than would be ideal has its center determined electronically and thus the time is measured from a reference corresponding to known temperature and instantaneous light source wavelength. The light source scan is ordinarily linear, but is not necessarily so, since conversion from time to a temperature reading is readily accomplished in known circuits, any repeatable non-linearity can be compensated. One example of conversion to a temperature representing signal is a circuit which samples the time analog, converts it to a digital value and addresses a read-only memory to produce a temperature representing signal.

Several arrangements for scanning the light source spectrum are described hereinafter.

BRIEF DESCRIPTION OF DRAWINGS

The details of my invention will be described in connection with my accompanying drawing in which FIG. 1 is a basic schematic block diagram of an instrument according to the invention;

FIG. 1(a) is a typical time/heating/wavelength curve for light source scanning in FIG. 1;

FIG. 1(b) is a time measurement graph for FIG. 1;

FIG. 2 is a version of the basic device of FIG. 1 employing an LED or laser diode light source;

FIG. 2(a) is a typical power/time curve for the laser or LED of FIG. 2;

FIG. 2(b) is a typical time/temperature curve for the LED or laser source of FIG. 2;

FIG. 3 is an externally heated reference crystal version of the invention;

FIG. 3(a) is a power/time curve for the LED source of FIG. 3;

FIG. 3(b) is a typical time/temperature curve for the reference crystal of FIG. 3;

FIG. 4 depicts a scanning arrangement variation of the invention using a driven monochromator;

FIG. 4(a) is a time/wavelength curve of monochromator operation in FIG. 4;

FIG. 4(b) is a photodiode output waveform versus time for FIG. 4.

BEST MODES FOR CARRYING OUT THE INVENTION

As aforementioned the selected concept for the temperature sensor, according to the invention, takes advantage of the optical absorption edge in a semiconductor. That is, light incident on a semiconductor of photon energy greater than the band-gap energy undergoes a sharp increase in absorption. The corresponding optical wavelength of the band-gap energy is known as the fundamental absorption edge. The absorption edge is temperature dependent. Since band-gap energy is a function of the lattice constant, as the temperature increases, the semiconductor expands and the band-gap energy decreases which results in an increase in the wavelength of significant absorption. Experimental studies reveal that the rate of change in band-edge wavelength over a large temperature is essentially constant, as shown in FIGS. 4(a) & 4(b). Using these properties of semiconductor absorption vs. temperature an accurate and stable optical sensor for temperature has been devised.

The temperature sensor design chosen is shown basically in FIG. 1. The sensor 12 is preferably an indium phosphite (INP) type crystal and the swept spectrum light source 10 (laser diode preferably) is of gallium arsenide (GaAs). Specifically, an indium phosphite telluride crystal has been found to be advantageous. The output of the laser diode 10 is nearly a spectral source whose center wavelength shifts to longer wavelengths as it is heated. The temperature of the laser diode 10 vs. the center wavelength of the output is a very repeatable curve. The temperature of the laser diode 10 is cycled over a suitable temperature range (not to be confused with the temperature to be measured) as its light output is transmitted to the sensor crystal. The transmission of the crystal (light amplitude at its output) is measured by a detector, photodiode 14. Optical fibers 11 and 13 form the input and output conductors, respectively. When the center wavelength of the laser diode 10 is below the band-edge fundamental wavelength, the crystal absorbs the indicident light and the detector 14 sees a negligibly small signal. But, when the laser diode center wavelength is equal to the band-edge wavelength, the crystal absorption abruptly changes and the incident light is transmitted by the semiconductor crystal 12 and the detector 14 sees a large signal. At this instant when transmission occurs through the sensor crystal, the wavelength of light transmitted by the crystal is known because the instantaneous output wavelength of the laser diode 10 is known, therefore the temperature of the sensor crystal is known from the temperature vs. band-edge wavelength curve of the crystal.

The preceeding discussion assumes an ideal crystal, i.e. one with no impurities. In an ideal crystal, the transmission of the incident light for a given wavelength goes from 0 to 100% very sharply as the temperature is varied to shift the band-edge about the incident wavelength, or conversely, as the incident wavelength crosses the wavelength of the band-edge for a given crystal temperature. In a practical material the transmission curve vs. temperature is broadened on the order of 45° K. This 45° K. broadening is almost constant over a large temperature range. When the spectral output of laser diode 10 is convoluted with the temperature/transmission curve of a sensor crystal, the resulting band-edge shape is broadened to about 55° K.

Even though the band-edge energy in a practical sensor does not produce a sharp discontinuity in the temperature vs. transmission curve, the determination of the sensor temperature can be made accurately. Electronically the problem reduces to one of accurately and repeatably measuring a threshold level on the experimentally determined (in electrical form) band-edge wavelength vs. temperature curve of the sensor crystal. That point on the curve that may be selected at the 50% transmission point, for example. This point corresponds to a band-edge temperature T center. If the output of the photodiode is amplified to voltage, V, at 100% transmission, the band-edge wavelength point corresponds to 50% transmission or an amplified voltage of V/2. Since the broadening of the transmission vs. temperature curve is 55° K., this gives a measurement sensitivity, S, of:

$$S = \tfrac{1}{2}V(\text{volts})/27.5 \text{ (degrees K)} = \frac{V}{55} \text{ volts/degree K}$$

The noise generated by the laser diode/photodiode combination is less than 150 mv, such that the resulting uncertainty, u, in the temperature determination is:

$$u = 0.150/S = 0.825° \text{ K.}$$

If another 0.2° K. is allowed for the uncertainty in the voltage corresponding to the center wavelength of the laser diode output, then the accuracy of the temperature of the crystal sensor is determinable to about 1° K.

Referring now to FIG. 1(a) this curve is self explanatory in depicting self-heating of the light source cyclically and the resulting spectrum scanning it produces. FIG. 1(b) describes the time conversion effected by the scanning in FIG. 1 from reference to band-edge crossover.

The elements 20, 21, 22, 23, 24, 25 and 27 are substantially the same as corresponding elements 10, 11, 12, 13, 14, 15 and 17 of FIG. 1, and the ref. input 16 to comparators 15 and 25 is a voltage establishing the equivalent reference temperature at $t_o$.

In FIG. 2, an LED drive 28 produces the FIG. 2(a) LED or laser diode self-heating drive. A "start" signal to counter 27 corresponds with $t_o$ on FIGS. 2(a) and 2(b). A stop signal is produced from comparator 25 when the aforementioned crossover is recognized. Thus the computer 27 includes a counter and conventional means for generating a temperature-representing reading by applying the count to a read-only memory, for example. The circuitry in computer 27 is straightforward and conventional and can produce an alphanumeric or some other display.

FIG. 3 includes repeat components found in FIGS. 1 and 2. These are optical fibers 32 and 34, sensing crystal 33, photodiode 35, comparator 36 (with ref. input 37), a computer 38 comparable to 27 of FIG. 2.

In FIG. 3 a control block 39(a) applies power to a heater 39 and contemporaneously starts the time counter in computer 38. This cyclical heating power application and the resulting time/Ref. crystal temperature are depicted in FIGS. 3(a) and 3(b) respectively.

It will be noted that the heating of reference crystal 31 (another semiconductor crystal similar to sensing crystal 33) has the effect of variably filtering the LED 30 output to provide a spectrally scanning light signal comparable to that produced by the self heated laser diode. That correlary effect is also known per se in the art.

The components 42, 43, 44, 45, 56 (with ref. input 47) and computer 48 will be recognized as equivalent to like elements in FIGS. 1, 2 and 3.

In FIG. 4, a monochromator 41 is driven by a drive 41a. That device 41 essentially varies the light frequency imparted into optical fiber 42 by selectively filtering a broad band light source 40. At a predetermined reference or starting light wavelength, 41a provides a start signal to the counter of computer 48, the latter being stopped as a result of detection of "crossover" by comparator 46 as in the previously described embodiments.

FIGS. 4(a) and 4(b) provide comparable waveform information respecting FIG. 4 as provided by FIGS. 3(a) and 3(b) in respect to FIG. 3 (for example).

An additional variation, is noted that the so-called band-gap voltage of an excited laser diode is accurately and repeatably related to the junction temperature thereof, and therefore to emitted light wavelength. That continuously varying band-gap voltage could be sampled by a recognition pulse from the comparator thereby also directly providing a temperature representing signal.

The components required to implement the invention are all prior art elements per se and they will be seen to be inexpensive and are known to be highly reliable.

The fact that the output wavelength of a laser-diode is directly related to its junction temperature is a useful attribute in various ways. The cyclically applied power pulses heat the diode junction linearly with time, therefore, temperature versus time and also time versus output wavelength are linear functions making calibration easy.

The combination using pulse laser diodes can be further improved if these laser diodes are of the single made type.

Various modifications and variations, in addition to those described, will suggest themselves to those of skill in this art once the inventive concepts are understood. Accordingly it is not intended that the drawings and description should be regarded as limiting the scope of the invention.

What is claimed is:

1. A temperature measuring device, comprising: a semiconductor crystal having, an optical high pass characteristic in wavelength terms, the band-edge wavelength between frequencies of maximum and minimum light transmission through said crystal being temperature dependent; a source of light energy of controllable wavelength; first light conducting means for conveying the light energy output of said source to said crystal; a light-to-electric transducer; second light conducting means for conveying light passing from said first light conveying means, through said crystal and to said transducer; scanning means for causing the wavelength of said light energy from said source to vary according to a predetermined function starting from an initial predetermined reference wavelength at least passing through said band-edge wavelength corresponding to all temperatures to be measured; and temperature analog means responsive to said source and said transducer and producing an output signal analagous to the temperature of said crystal as a function of the difference between said predetermined reference wavelength at said band edge.

2. The device according to claim 1 in which said temperature analog means measures the scan time between said reference wavelength and the wavelength of said band-edge to produce said output signal analagous to said crystal temperature.

3. The device according to claim 1 in which said first and second light conducting means are optical fibers.

4. The device according to claim 2 in which said first and second light conducting means are optical fibers.

5. The device according to claim 4 in which said source of light energy is a laser diode and said scanning occurs due to the cyclical self-heating of said laser diode when cyclically energized.

6. The device according to claim 4 in which said source of light energy is a light emitting diode and said scanning occurs due to the cyclical self-heating of said light emitting diode when cyclically energized.

7. Apparatus according to claim 5 in which said temperature analog means is responsive to the junction temperature of said laser diode, said junction temperature being accurately representative of the emitted wavelength of said laser diode.

8. Apparatus according to claim 2 in which said source is a broad spectral source and in which said scanning means comprises variable filtering means in the light path between said source and said first light conducting means.

9. Apparatus according to claim 8 in which said variable filtering means comprises a second semiconductor crystal and means for cyclically heating said second crystal to produce said variable filtering.

10. Apparatus according to claim 8 in which said variable filtering means comprises a monochrometer and mechanical drive means therefor whereby said light energy wavelength is varied.

11. Apparatus according to claim 1 in which said semiconductor crystal is an indium phosphite crystal.

12. Apparatus according to claim 2 in which said semiconductor crystal is an indium phosphite crystal.

13. Apparatus according to claim 9 in which said second crystal is an indium phosphite crystal.

* * * * *